United States Patent
Krsljanin

(10) Patent No.: US 7,944,480 B2
(45) Date of Patent: May 17, 2011

(54) METHOD FOR THE TRANSFER OF DATA FLOW OF DIGITAL IMAGES AND DIGITAL DETECTION UNIT

(75) Inventor: Milan Krsljanin, Hampshire (GB)

(73) Assignee: Arnold & Richter Cine Tecknik GmbH & Co. Betriebs KG, Munich (DE)

( * ) Notice: Subject to any disclaimer, the term of this patent is extended or adjusted under 35 U.S.C. 154(b) by 1250 days.

(21) Appl. No.: 11/462,129

(22) Filed: Aug. 3, 2006

(65) Prior Publication Data

US 2007/0071417 A1    Mar. 29, 2007

(30) Foreign Application Priority Data

Aug. 8, 2005  (DE) .......................... 10 2005 037 282

(51) Int. Cl.
*H04N 5/225* (2006.01)
(52) U.S. Cl. .............. 348/218.1; 348/222.1; 348/231.99
(58) Field of Classification Search ............... 348/218.1, 348/222.1, 231.99
See application file for complete search history.

(56) References Cited

U.S. PATENT DOCUMENTS

| 5,280,397 A | | 1/1994 | Rhodes | |
|---|---|---|---|---|
| 5,696,560 A | * | 12/1997 | Songer | 348/436.1 |
| 5,999,220 A | | 12/1999 | Washino | |
| 2001/0041826 A1 | * | 11/2001 | Higuchi et al. | 348/68 |
| 2002/0027723 A1 | * | 3/2002 | Lei | 359/691 |
| 2002/0118296 A1 | | 8/2002 | Schwab et al. | |
| 2002/0140806 A1 | * | 10/2002 | Abe et al. | 348/65 |
| 2005/0253950 A1 | * | 11/2005 | Miura | 348/333.11 |
| 2005/0275744 A1 | * | 12/2005 | Yasuda | 348/345 |
| 2006/0001929 A1 | * | 1/2006 | Yamamoto | 358/524 |
| 2006/0176951 A1 | * | 8/2006 | Berman et al. | 375/240.01 |
| 2006/0210194 A1 | * | 9/2006 | Kagle et al. | 382/284 |
| 2007/0002162 A1 | * | 1/2007 | Yoo | 348/349 |

FOREIGN PATENT DOCUMENTS

| DE | 4117994 | 12/1992 |
|---|---|---|
| DE | 69900639 | 7/2002 |
| DE | 69621782 | 2/2003 |

* cited by examiner

*Primary Examiner* — Gevell Selby
(74) *Attorney, Agent, or Firm* — Gifford, Krass, Sprinkle, Anderson & Citkowski, P.C.

(57) ABSTRACT

A data stream of full digital images having a first predetermined number of picture elements is transferred via an interface to an image recording unit. The image recording unit stores digital images with a second number of picture elements, which is lower than a first. The full digital images generated with the first number of picture elements are divided into two part digital images, each having a number of picture elements used for storing image information. The image information stored in the two part images together contains the total information content of the original full image. A part image of a full digital image is associated with a first data stream and another part image is associated with a second data stream. The data streams are transferred via the interface to the image recording unit and are stored separately from one another.

32 Claims, 4 Drawing Sheets

METHOD FOR THE TRANSFER OF DATA FLOW OF DIGITAL IMAGES AND DIGITAL DETECTION UNIT

CROSS-REFERENCE TO RELATED APPLICATIONS

This application claims the benefit of German Patent Application No. 10 2005 037 282.1, which was filed on Aug. 8, 2005, the disclosure of which is incorporated herein by reference.

FIELD OF THE INVENTION

The present invention relates to a method for the transfer of a data stream of full digital images generated by a digital image detection unit with a first predetermined number of picture elements via an interface to an image recording unit. The invention is furthermore directed to a corresponding digital image detection unit.

BACKGROUND OF THE INVENTION

The HD (high definition) motion picture cameras widespread today are only insufficiently suitable to be able to generate digital images with an aspect ratio of 2.35:1 (Cinemascope process) for film production. In accordance with the HD standard, these cameras record an image format of 16×9 so that, when spherical lenses are used, digital images are generated with an image format of 16×9, which corresponds to an image aspect ratio of 1.778:1.

These images can only be converted into the Cinemascope format in that substantial horizontal image portions are cut off at the upper and lower side of the image. However, this is associated with an unwanted reduction in the vertical resolution of the resulting image.

Whereas typically so-called anamorphic lenses with a squeeze of 2:1 are used in the Cinemascope process to squeeze a scene with an image ratio of 2.35:1 onto a 4×3 sensor (or onto a 35 mm film in analog processes), so-called semi-anamorphic optical systems, which do not correspond to the conventional standard and are therefore currently not available, would have to be used for the imaging of a corresponding scene on an HD sensor with an image format of 16×9. In addition to the costs required for the development of such lenses, images taken using such a semi-anamorphic lens would create a different impression than images taken with conventional anamorphic lenses so that the acceptance of such semi-anamorphic lenses is questionable.

Since the taking of images in the 4×3 format, optionally with anamorphic lenses for the generation of the Cinemascope format has been widespread both with analog and, in the meantime, with digital taking processes, for a long time, the further use of digital motion picture cameras with a 4×3 sensor and conventional anamorphic lens elements for the taking of films in the Cinemascope process is desirable.

Since, in the meantime, the HD format with an image format of 16×9 has become established for the storage and the playing back of digitally encoded films, the normally available standardized image recording units, for example in the form of hard disk recorders or tape recording devices, are also usually only suitable for the recording of digital images in the 16×9 format.

Starting from an identical number of horizontal picture elements of, for example, 1920 pixels per image both for the 4×3 format and for the 16×9 format, the problem thus results of how the larger data volume of a digital image present in the 4×3 format can be recorded and stored by a recording device working according to the HD standard. The problem furthermore occurs that, in accordance with the HD SDI standard (high definition serial digital interface standard), data transfer rates are only possible with which no full images taken in the 4×3 format can be transmitted in real time (>25 frames per second).

The same problems exist when images of a film typically present in 35 mm (4×3 format) scanned using a film scanner should be recorded using a conventional HD recorder without any quality loss, i.e. without any reduced image information.

SUMMARY OF THE INVENTION

It is the object of the present invention to provide a method and an apparatus with which it is possible to transmit full digital images, in particular in the 4×3 format, generated with a first number of picture elements to an image recording device and to store them in it at full resolution and without a reduction in image quality, with the image recording unit only being made for the storage of digital images with a second number of picture elements reduced with respect to the first number of picture elements, in particular as a conventional HD compatible recording device.

In accordance with the invention, this object is satisfied by a method for the transfer of a data stream of full digital images generated by a digital image detection unit with a first predetermined number of picture elements via an interface to an image recording unit, with the interface being made for the transfer of at least one data stream of digital images with a second number of picture elements different from the first number of picture elements and the image recording unit being made for the storage of digital images with the second number of picture elements and with the second number of picture elements being lower than the first number of picture elements, wherein the full digital images generated with the first number of picture elements are in each case divided into two part digital images, with the part images each having a number of picture elements which is used for the storage of image information and which is lower than or equal to the second number of picture elements, and with the image information stored in the two part images together containing the total information content of the original full image, two data streams of the digital part images being generated, with in each case a part image of a full digital image being associated with the first data stream and the other part image of the full digital image being associated with the second data stream, the two data streams of the part digital images being transmitted to the image recording unit via the interface and the transmitted part digital images being stored with the second number of picture elements separately in each case in the image recording unit.

A digital image detection unit in accordance with the invention comprises a sensor for the generation of full digital images with a first predetermined number of picture elements, an interface for the transfer of at least one data stream of digital images with a second number of picture elements different from the first number of picture elements to an image recording unit, with the second number of picture elements being lower than the first number of picture elements, an image division unit which is made for the division of the full images generated into two respective part digital images, with the part images each having a number of picture elements used for the storage of image information which is lower than or equal to the second number of picture elements and with the image information stored in the two part images together containing at least the total information content of the original full image, a data stream generation unit for the generation of two data streams of the part digital images, with one respective part image of a full digital image being associated with the first data stream and the other part image of the full digital image being associated with the second data stream, and a control unit for the control of the transfer of the two data streams of the part digital images to the image recording unit via the interface.

In accordance with the invention, the recorded images generated with the first number of picture elements are thus divided into two part digital images whose number of picture elements actually used for the storage of image information is lower than or equal to the second number of picture elements, i.e. that number of picture elements with which the images can be stored in the image recording unit at least along the vertical or the horizontal direction. In this connection, all the picture elements of the two part images therefore do not have to be used for the storage of image information from the full image. It is, however, important that the digital full images are divided into the two part digital images such that the total information content of the original full image is maintained in the two part images so that a later reconstruction of the original full image is possible without any loss of quality and with the original resolution. Since usual HD compatible recording units often have two HD SDI compatible inputs for the parallel recording of two HD SDI compatible data streams, such standardized recording units can be used without change. It is generally also possible to use two recording devices separate from one another of which each records one of the two data streams of the part digital images. It is necessary in this context that the two recording devices or the respective data streams are synchronized with one another so that a precise time association of the part images generated is ensured.

The recording of full digital images in the 4×3 format on standardized HD compatible recording units is thus possible with the invention without any loss in quality and reduction in the resolution.

A particular advantage of the invention consists of the fact that the said division of the full images (recorded images) into the two respective part images can take place such that one of the two part images can be used as a useful image for a check of the image information of the total image and the other part image can be used as an additional image for the provision of the supplementary image information. In other words, the named useful image can be observed without further processing on a 16×9 monitor, for example, in order to hereby make a first inspection of the recorded images.

The number of picture elements is to be understood in connection with the invention as the number of the picture elements in the vertical direction (=number of lines), or the number of the picture elements in the horizontal direction (=number of columns) or the total number of the picture elements of the image in question.

In accordance with an advantageous embodiment of the invention, the number of picture elements of the part images is matched to the second number of picture elements—i.e. the number of picture elements of the image recording unit—on the division of the data stream into the part images when the number of picture elements of the part images actually used for the storage of image information is lower than the second number of picture elements. If the part images generated on the division of the data stream are already present with the second number of picture elements, a corresponding matching is no longer necessary since the part images can in this case be transferred unchanged to the image recording unit working with the second number of picture elements and can be stored or recorded in it. A matching to the second number of picture elements can take place, for example, in that "black bars" are generated at the upper and lower margins and/or at the left hand and right hand margins of the digital images.

In accordance with a further preferred embodiment of the invention, the part digital images generated from a full digital image have the same number of picture elements. A simple reconstruction of the part digital images stored in the image recording unit is thereby possible.

The full digital images with the first number of picture elements are preferably generated in a standardized 4×3 format. Depending on the number of pixels of the sensor used, the first number of picture elements can amount, for example, to 1920×1440 pixels or, for example, to 2880×2160 pixels.

The part digital images are advantageously stored in a standardized 16×9 format in the image recording unit. If the part digital images are already present in the 16×9 format after their generation, the part digital images can thus already be transferred in a standardized 16×9 format to the image recording unit via the interface. A typical resolution for a standardized 16×9 format is the HD format with 1920×1080 pixels.

In accordance with a further advantageous embodiment of the invention, the full digital images with the first number of picture elements have a predetermined number of lines and a predetermined number of columns, with in each case all even-numbered lines of the full digital image being associated with a part image of the first data stream and all the odd-numbered lines of the full digital image being associated with a part image of the second data stream on the division of the full digital images.

This special division of the full digital images into two respective part digital images has the advantage that, on the recording of the full images using an anamorphic optical system, the part image appears as a non-distorted 2.35:1 image within a 16×9 image (so-called "letter box") when viewed on a 16×9 monitor.

In a further preferred embodiment of the invention, the full digital images with the first number of picture elements have a predetermined number of lines and a predetermined number of columns, with in each case a predetermined number of lines from the middle region of the full digital image being associated with a part image of the first data stream and the remaining, upper and lower lines of the full digital image being associated with a part image of the second data stream on the division of the full digital images into the part images. The number of lines corresponding to the second number of picture elements can preferably be used as the predetermined number of lines from the middle region. It is furthermore advantageous for the middle region of the full digital image to be selected to be symmetrical to the horizontal central axis of the full digital image.

On this division of the full digital image into part digital images, when a spherical lens is used, the middle region of the taken image is stored in the respective first part image such that the stored first part images are suitable alone for reproduction with the second resolution, for example in the 16×9 format. Since no material objects are usually contained in the upper and lower regions of the taken image, a digital image detection unit in accordance with the invention can in this case be used as a "normal" HD motion picture camera.

The possibility exists, when an anamorphic lens is used with the same taking unit (camera), to make an expansion of the image to the Cinemascope format by means of the upper and lower edge bars stored in the second part images.

The remaining upper and lower lines of the full digital image are preferably associated with the part image of the second data stream such that they also form the upper and/or the lower lines of the second part digital image. The unused pixels lying between the upper and lower lines of the second part digital image can be masked or marked with "black".

In accordance with a further advantageous embodiment of the invention, the full digital images with the first number of picture elements have a predetermined number of lines and a predetermined number of columns, in each case with a predetermined number of lines from the upper region of the full digital image being associated with a part image of the first data stream and the remaining, lower lines of the full digital image being associated with a part image of the second data stream on the division of the full digital images into the part images.

Depending on the application, a spherical lens or an anamorphic lens, in particular with a distortion factor of 2:1, is advantageously used for the generation of the full digital images.

The digital image detection unit can be made, for example, as a digital motion picture camera or also as a film scanner. The interface is advantageously made in accordance with the HD SDI standard to permit an unproblematic connection to the recording units compatible with the HD SDI standard.

Further areas of applicability of the present disclosure will become apparent from the detailed description provided hereinafter. It should be understood that the detailed description and specific examples, while indicating the preferred embodiment of the present disclosure, are intended for purposes of illustration only and are not intended to limit the scope of the present disclosure.

BRIEF DESCRIPTION OF THE DRAWINGS

The invention will be described in more detail in the following with reference to embodiments and to the drawings, in which are shown.

DETAILED DESCRIPTION OF THE INVENTION

The following description of the preferred embodiment is merely exemplary in nature and is in no way intended to limit the present disclosure, its application, or uses.

Figure 1:
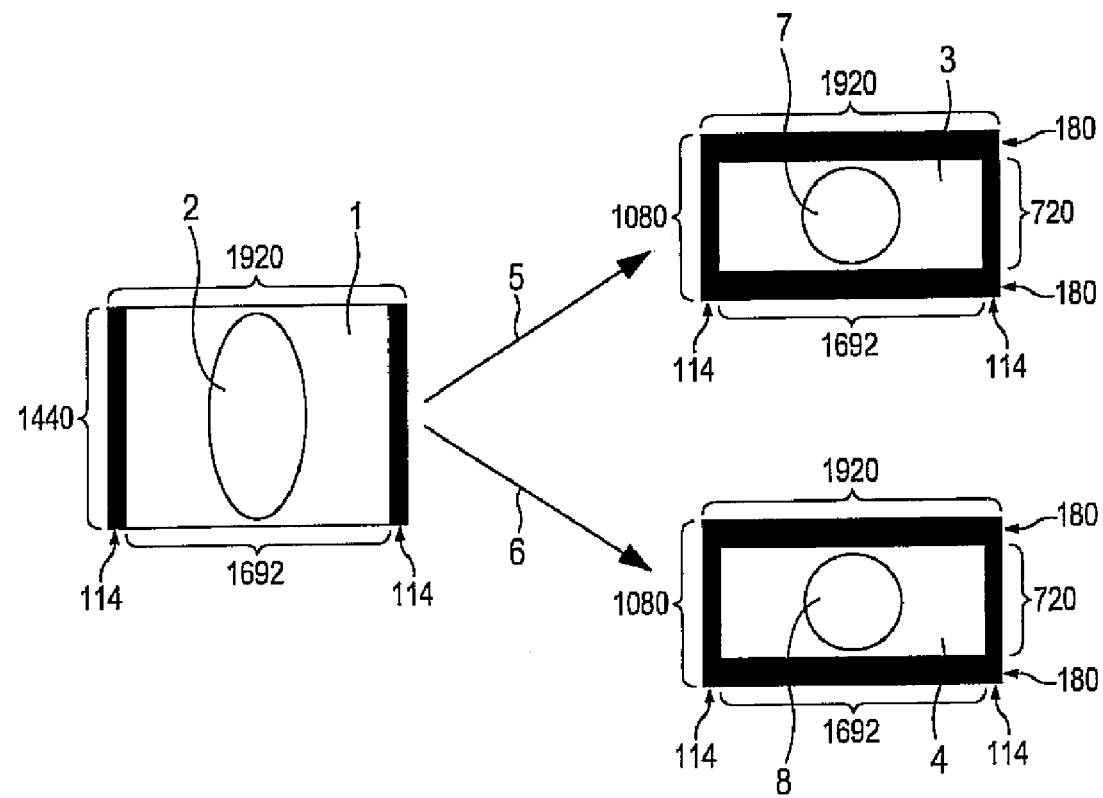
FIG. 1 is a schematic representation of the division of a full digital image into two part digital images in accordance with a first embodiment of the invention.

FIG. 1 shows a full digital image 1 such as is generated in the application of the Cinemascope process using an anamorphic lens and a sensor with 1920×1440 pixels. The originally circular object is distorted by expansion in the vertical direction to form an oval 2 by the anamorphic lens.

When an anamorphic lens with the distortion factor 2:1 is used, the image to be taken in the Cinemascope format of 2.35:1 is imaged into a full digital image with 1692×1440 picture elements so that respectively unused perpendicular bars remain with a width of 114 picture elements at the right hand and at the left hand margin of the sensor surface. The corresponding picture elements are either not read out or can be marked with "black", for example, so that two perpendicular black bars arise in the full digital image 1.

In accordance with the invention, the correspondingly taken full digital images 1 are divided into two part digital images 3, 4 as is indicated by arrows 5, 6.

The division takes place in accordance with FIG. 1 in the manner such that the picture elements in each case lying on the even-numbered image lines of the full digital image 1 are associated with the part digital image 3, whereas the picture elements of the odd-numbered image lines of the full digital image 1 in each case are associated with the part digital image 4.

With a line number of a total of 1440 lines of the full digital image 1, 720 image lines are thus associated with each of the two part images 3, 4, as can be seen from FIG. 1. Since the taken image was originally taken with an anamorphic lens with the distortion ratio 2:1, in this division (halving of the line number), the taken object is again shown in its original shape, as a circle 7 or 8.

Since the part images with a height of 720 image lines do not completely fill the HD image format with a height of 1080 image lines, horizontally extending black bars with a height of in each case 180 image lines are present at the upper and at the lower margins of the part images 3, 4.

The part images 3, 4 generated in this manner thus have an HD conforming resolution of 1920×1080 and can be transferred in two separate data streams together with respectively following part images 3, 4 via an HD-SDI conforming standard interface to an HD compatible recording unit and can be stored separately there in the standard HD format.

As can be recognized from FIG. 1, each of the part images 3, 4 can be presented without distortion without any further processing via a customary 16×9 display, with half the vertical resolution, but with full horizontal resolution. It is thus possible with reference to an individual data stream to check the scenes recorded in a simple manner during production without a complex recombination of the images in the 2.35:1 format being necessary. This recombination can thus be postponed to the final post-production.

It is generally possible with this embodiment as also with all further embodiments for the total width of 1920 pixels of the taking sensor to be used, which results in an image aspect ratio of 2.667:1 when an anamorphic lens with a distortion factor of 2:1 is used. In this case, the part images of the two data streams each have an effective resolution of 1920×720 pixels (picture elements actually used for the storage of image information). The standardized resolution of 1692×720 picture elements or of the recombined squeezed image of 1692× 1440 picture elements can then be established in the post-production.

Figure 2:
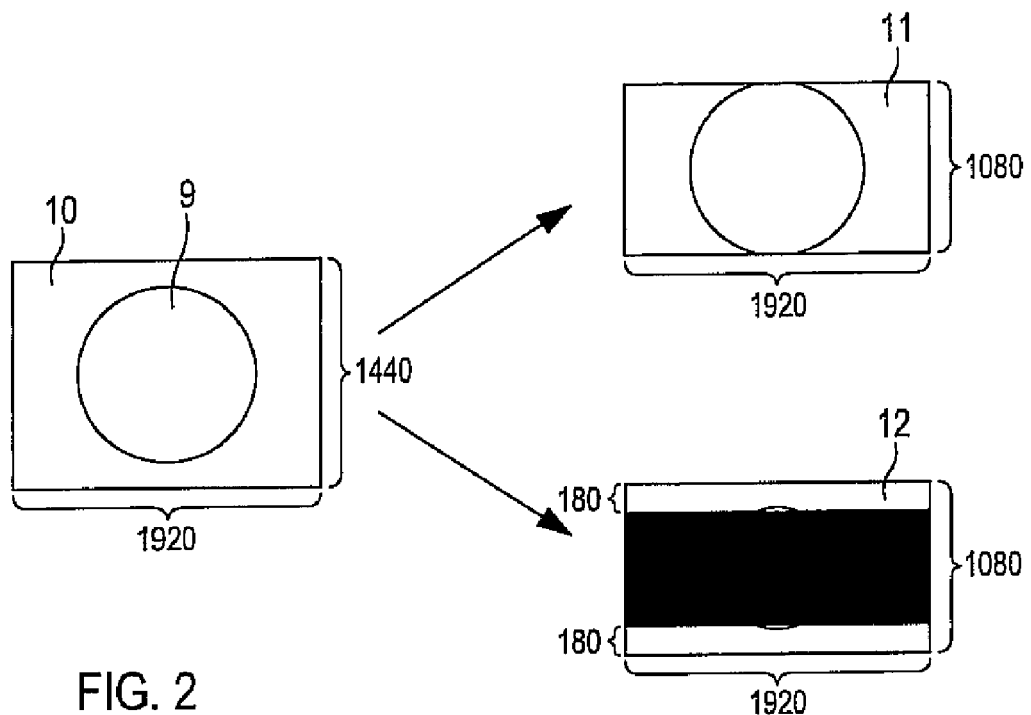
FIGS. 2 to 4 are three further embodiments for the division of a full digital image into two part digital images.

In the example of FIG. 2, the image was taken with a spherical lens so that the taken object is shown without distortion as a circle 9 in the full digital image 10. This is, for example, sensible when it is a television recording in which the reproduction takes place in the 4×3 format. In this case, the full digital image 10 is free from black vertical or horizontal bars.

In accordance with FIG. 2, the division of the full digital image 10 takes place such that 1080 horizontal image lines arranged centrally are associated with the first digital part image 11 and the remaining respective 180 horizontal image lines at the upper and lower margins of the full digital image 10 are associated with the second part digital image 12. The upper 180 horizontal image lines in each case taken from the full digital image 10 are also arranged at the upper margin in the part digital image 12 and the originally lower 180 horizontal image lines are likewise arranged at the lower margin in the part digital image 12 so that an unused black region is created in the central region of the part digital image 12.

It is advantageous with this division that the first part digital image 11 contains the material part of the full digital image 10 in the standardized 16×9 format and the part images 11 can therefore be viewed without any further processing on a 16×9 monitor. The full digital images 10 can in turn be produced without any loss in quality and be shown in the 4×3 format after corresponding recombination of the part images 11 with the respective part images 12 due to the two part digital images 12.

Figure 3:
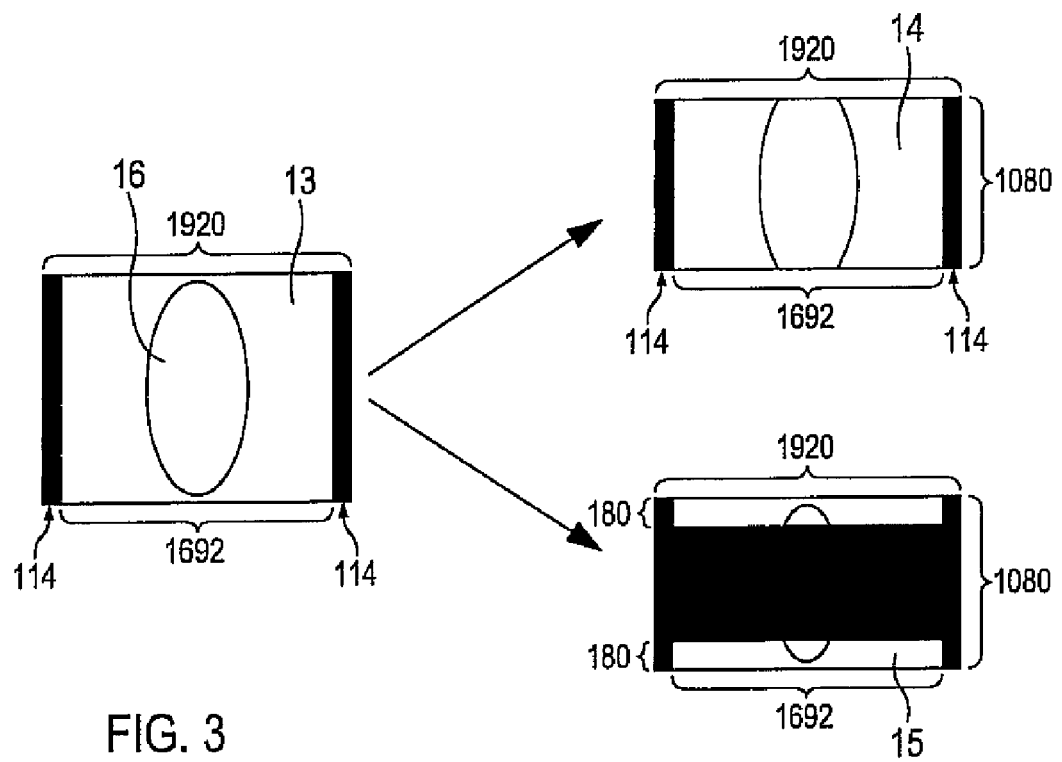

FIG. 3 shows the same division of a full digital image 13 into two part digital images 14, 15 as in FIG. 2. Unlike FIG. 2, however, the full digital image 13 was taken with an anamorphic lens so that the distorted recording of the object 16 already shown in FIG. 1 occurs. In this division using the anamorphic taking process, after recombination of the two part images 14, 15 stored in the 16×9 format, the original full digital image 13 can be restored in the format 2.35:1 with full resolution and without any loss in quality.

Figure 4:
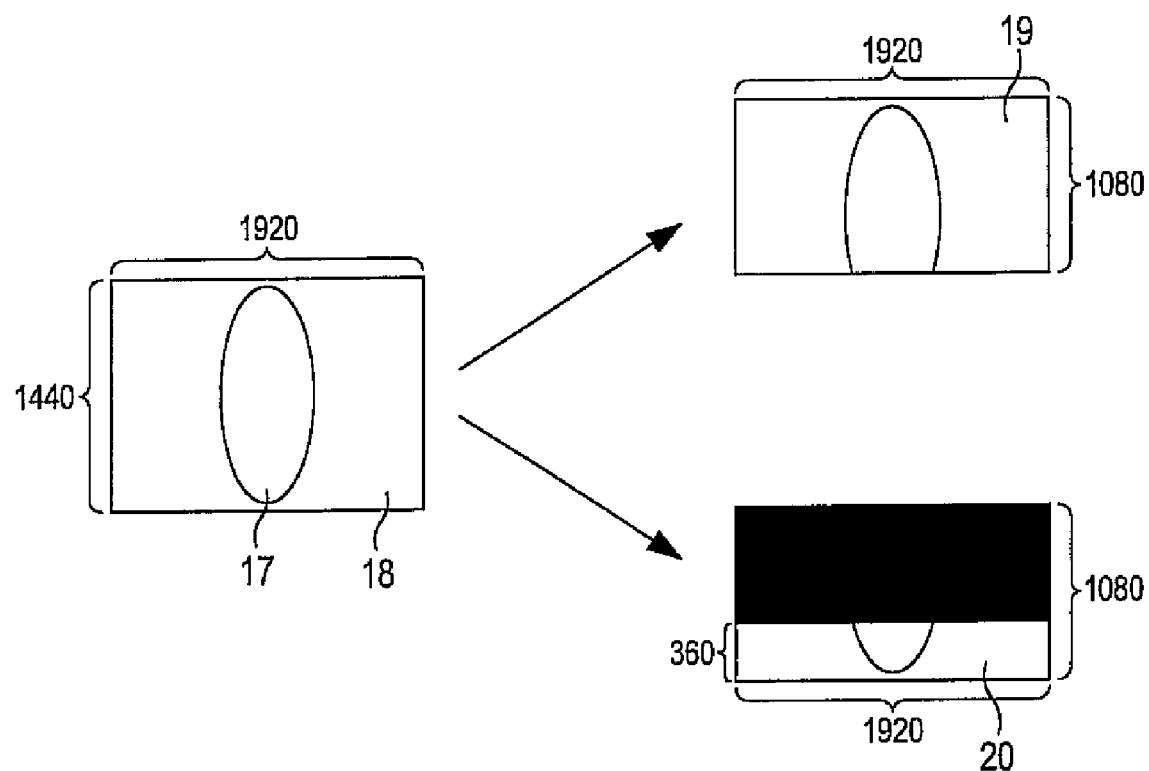

The same also applies to the division in accordance with FIG. 4, in which—on a recording of the object 17 using an anamorphic lens—a full digital image 18 is divided into two part digital images 19, 20 such that the 1080 upper horizontal image lines are associated with the first part digital image 19 and the remaining 360 horizontal image lines disposed at the lower margin are associated with the second part digital image 20.

The invention does not only prove to be advantageous when—as shown in FIGS. 1 to 4—the total number of picture elements of the part images 3, 4, 11, 12, 14, 15, 19, 20 is lower than the total number of picture elements of the respective full image 1, 10, 13, or 18. The explained advantage of the maintenance of quality is also achieved when the number of picture elements of the part images is only lower along the vertical or the horizontal direction than with the full image, as can occur, for example, on a conversion from a 4×3 format to a 16×9 format.

Figure 5:
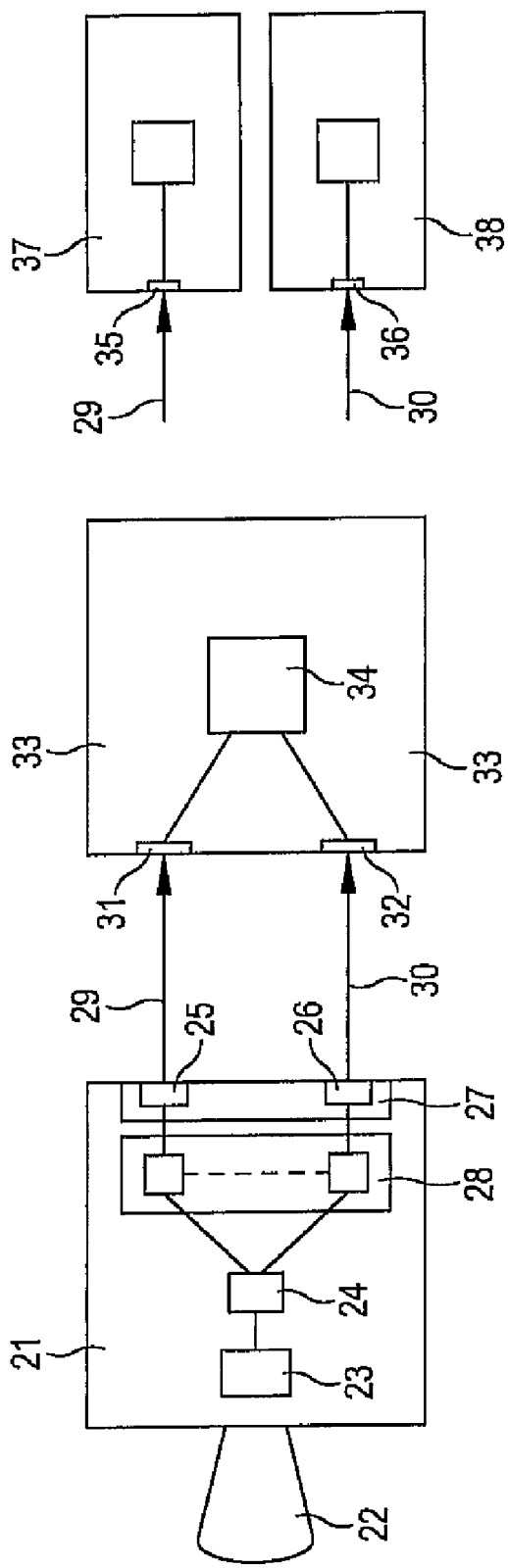
FIG. 5 is a schematic representation of a digital image detection unit made in accordance with the invention with two different image recording units.

In FIG. 5, a digital image detection unit 21 made in accordance with the invention is shown schematically which is made as a digital motion picture camera. The image detection unit 21 comprises a lens 22, which is made spherical or anamorphic depending on the application, and a sensor 23 which preferably has a format of 4×3.

The sensor 23 is connected at its output to an image division unit 24 by which the full digital images generated by the sensor 23 are divided into two part digital images and are subsequently output for the generation of a data stream so that the image division unit 24 simultaneously forms a data stream generation unit. The two data streams of part digital images generated in this manner are transmitted to two outputs 25, 26, in particular HD SDI compatible outputs, of an interface 27, with the transfer of the two data streams of the part digital images being controlled via a control unit 28.

The two digital data streams are transferred via data cables 29, 30 to HD SDI conforming inputs 31, 32 of an HD recorder 33 which is capable of the simultaneous recording of two parallel data streams of part digital images, in particular in the 16×9 format.

The HID recorder can record the part digital images, for example, on a hard disk 34 or on any other suitable medium such as a magnetic tape or an optical disk.

Alternatively, it is shown in the right hand region in FIG. 5 that the data streams can also be directed via the data lines 29, 30 to two HID recorders 37, 38, each only provided with one input 35, 36, for recording.

Figure 6:
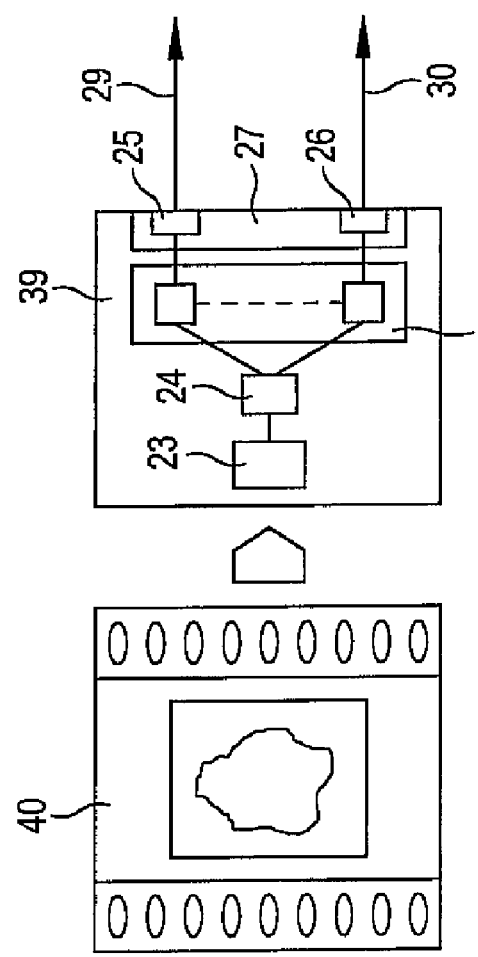
FIG. 6 is a further embodiment of a digital image detection unit made in accordance with the invention.

It is shown in FIG. 6 that, instead of a digital motion picture camera, a film scanner 39 can be used for the generation of the full digital images and for the subsequent conversion into two data streams of part digital images. With the film scanner 39, for example, a film present in 35 mm format can be scanned and converted into a data stream of full digital images which are in turn divided into two data streams of part digital images, as was already described. All the further process steps are identical to the steps used with a motion picture camera.

The description of the present disclosure is merely exemplary in nature and, thus, variations that do not depart from the gist of the present disclosure are intended to be within the scope of the present disclosure. Such variations are not to be regarded as a departure from the spirit and scope of the present disclosure.

The invention claimed is:

1. A method for the transfer of a data stream of full digital images (1; 10; 13; 18) generated by a digital image detection unit (21, 39) with a first predetermined number of picture elements via an interface (27) to an image recording unit (33, 37, 38), wherein the interface (27) is made for the transfer of at least one data stream of digital images with a second number of picture elements different from the first number of picture elements and the image recording unit (33, 37, 38) is made for the storage of digital images with the second number of picture elements, and wherein the second number of picture elements is lower than the first number of picture elements, the method comprising:

dividing the full digital images (1; 10; 13; 18) generated with the first number of picture elements into two part digital images (3, 4; 11, 12; 14, 15; 19, 20), with the part images (3, 4; 11, 12; 14, 15; 19, 20) each having a number of picture elements used for the storage of image information, which is lower than or equal to the second number of picture elements, wherein the image information stored in the two part images (3, 4; 11, 12; 14, 15; 19, 20) together contain the total information content of the original full image (1; 10; 13; 18);

generating two data streams of the digital part images (3, 4; 11, 12; 14, 15; 19, 20), with one respective part image (3; 11; 14; 19) of a full digital image (1; 10; 13; 18) being associated with the first data stream and the other part image (4; 12; 15; 20) of the full digital image (1; 10; 13; 18) being associated with the second data stream;

transferring the two data streams of the part digital images (3, 4; 11, 12; 14, 15; 19, 20) to the image recording unit (33, 37, 38) via the interface; and separately storing the transferred part digital images (3, 4; 11, 12; 14, 15; 19, 20) from one another in each case and with the second number of picture elements in the image recording unit (33, 37, 38);

wherein the full digital images (10; 13) with the first number of picture elements have a predetermined number of lines and a predetermined number of columns; and wherein, in each case, a predetermined number of lines from the middle region of the full digital image (10; 13) is associated with a part image (11; 14) of the first data stream and the remaining, upper and lower lines of the full digital image (10; 13) is associated with a part image (12; 15) of the second data stream on the division of the full digital images (10; 13) into the part images (11, 12; 14, 15).

2. A method in accordance with claim 1, wherein the number of lines of the second number of picture elements is used as the predetermined number of the lines from the central region of the full digital image.

3. A method in accordance with claim 1, wherein the middle region of the full digital image (10; 13) is selected to be symmetrical with the horizontal central axis of the full digital image (10; 13).

4. A method in accordance with claim 1, wherein remaining upper and lower lines of the full digital image (10; 13) are associated with the part image (12; 15) of the second data stream such that they also form the upper and/or the lower lines of the part digital image (12; 15).

5. A method for the transfer of a data stream of digital full images generated by a digital image detection unit with a first predetermined number of picture elements via an interface to an image recording unit, wherein the interface is adapted to transfer at least one data stream of a plurality of digital images with a second number of picture elements lower than the first number of picture elements and wherein the image recording unit is adapted to store digital images having the second number of picture elements, the method comprising:
  generating a full image data stream of a plurality of digital full images with the first number of picture elements;
  dividing each of the full images generated with the first number of picture elements into two digital part images, with the part images each having a number of picture elements used for the storage of image information which is lower than or equal to the second number of picture elements, wherein the image information stored in the two part images together contain the total information content of the full image;
  generating a first and a second part image data stream of the part images in such a way that each of the first and second part image data streams comprises a plurality of the part images derived from the full images, with one part image of each full image being associated with the first part image data stream and the other part image of the same full image being associated with the second part image data stream;
  transferring the first and second part image data stream to the image recording unit via the interface; and
  storing all of the transferred part images in the image recording unit.

6. A method in accordance with claim 5, wherein the number of picture elements of the part images is matched to the second number of picture elements before the transfer if the number of picture elements of the part images generated on the division of the full image data stream and used for the storage of image information is lower than the second number of picture elements.

7. A method in accordance with claim 5, wherein the part images generated from each full image have the same number of picture elements.

8. A method in accordance with claim 5, wherein the full images with the first number of picture elements are generated in a standardized 4×3 format.

9. A method in accordance with claim 5, wherein the part images are stored in a standardized 16×9 format in the image recording unit.

10. A method in accordance with claim 5, wherein the part images are transferred via the interface in a standardized 16×9 format.

11. A method in accordance with claim 5, wherein the full images with the first number of picture elements have a predetermined number of lines and a predetermined number of columns; and wherein all even-numbered lines of each full digital image are associated with a part image of the first part image data stream and all the odd-numbered lines of the same full image are associated with a part image of the second part image data stream in the step of dividing the full images into the part images.

12. A method in accordance with claim 5, wherein the full images with the first number of picture elements have a predetermined number of lines and a predetermined number of columns; and wherein a predetermined number of lines from a central region of each full image is associated with a part image of the first part image data stream and the remaining, upper and lower lines of the same full image are associated with a part image of the second part image data stream in the step of dividing the full images into the part images.

13. A method in accordance with claim 12, wherein the number of lines of the second number of picture elements is used as the predetermined number of the lines from the central region of the full digital image.

14. A method in accordance with claim 12, wherein the central region of each full image is selected to be symmetrical with the horizontal central axis of the full image.

15. A method in accordance with claim 12, wherein remaining upper and lower lines of each full image are associated with the respective part image of the second part image data stream such that they also form the upper and/or the lower lines of the respective part image of the second part image data stream.

16. A method in accordance with claim 5, wherein the full images with the first number of picture elements have a predetermined number of lines and a predetermined number of columns; and wherein a predetermined number of lines from an upper region of each full image is associated with a part image of the first part image data stream and the remaining, lower lines of the same full image are associated with a part image of the second part image data stream in the step of dividing the full images into the part images.

17. A method in accordance with claim 5, wherein a spherical lens is used for generating the full images.

18. A method in accordance with claim 5, wherein an anamorphic lens, in particular with a distortion factor of 2:1, is used for generating the full images.

19. A method in accordance with claim 5, wherein the first and second part image data streams are transmitted via two data lines from the image detection unit to the image recording unit in parallel with one another, in particular synchronized with one another.

20. A method in accordance with claim 5, wherein the transferred part images are stored in the image recording unit such that they have the second number of picture elements.

21. A method in accordance with claim 5, wherein the transferred part images associated with the first part image data stream and the transferred part images associated with the second part image data stream are stored in the image recording unit separately from one another.

22. A method in accordance with claim 5, wherein the image recording unit stores all transferred part images so as to create a record that comprises all transferred part images.

23. A method in accordance with claim 5, wherein the digital image detection unit and the image recording unit are disposed in separate devices.

24. A method in accordance with claim 5, wherein an interface is used which is only capable of transferring data streams of digital images having the second number of picture elements.

25. A method in accordance with claim 5, wherein the image recording unit is only capable of storing digital images having the second number of picture elements.

26. A digital image detection unit, comprising:
  a sensor adapted to generate a full image data stream of a plurality of digital full images each having a first predetermined number of picture elements;
  an interface adapted to transfer at least one data stream of a plurality of digital images with a second number of picture elements lower than the first number of picture elements to an image recording unit;

an image division unit, which divides each of the generated full images into two digital part images, with the part images each having a number of picture elements used for the storage of image information which is lower than or equal to the second number of picture elements, wherein the image information stored in the two part images together contains the total information content of the full image;

a data stream generation unit which generates a first and a second part image data stream of the part images in such a way that each of the first and second part image data streams comprises a plurality of the part images generated from the full images, with one part image of each full image being associated with the first part image data stream and the other part image of the same full image being associated with the second part image data stream; and a control unit which controls the transfer of the first and second part image data streams of the part images via the interface to the image recording unit such that all of the part images are stored in the image recording unit.

27. A digital image detection unit in accordance with claim 26, wherein the digital image detection unit is a digital motion picture camera.

28. A digital image detection unit in accordance with claim 26, wherein the digital detection unit is a film scanner.

29. A digital image detection unit in accordance with claim 26, wherein the interface is made in accordance with the HD SDI (high definition serial digital interface) standard.

30. A digital image detection unit in accordance with claim 26, wherein the sensor has an image format of 4×3.

31. A digital image detection unit in accordance with claim 26, wherein the digital image detection unit is formed separately from the image recording unit.

32. A digital image detection unit in accordance with claim 26, wherein the interface is only capable of transferring data streams of digital images having the second number of picture elements.

* * * * *